(12) United States Patent
Yoshida

(10) Patent No.: US 8,017,278 B2
(45) Date of Patent: Sep. 13, 2011

(54) MOVING OBJECT WITH FUEL CELL SYSTEM

(75) Inventor: Naohiro Yoshida, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1275 days.

(21) Appl. No.: 11/632,663

(22) PCT Filed: Sep. 9, 2005

(86) PCT No.: PCT/JP2005/017082
§ 371 (c)(1),
(2), (4) Date: Jan. 17, 2007

(87) PCT Pub. No.: WO2006/028291
PCT Pub. Date: Mar. 16, 2006

(65) Prior Publication Data
US 2007/0298705 A1 Dec. 27, 2007

(30) Foreign Application Priority Data
Sep. 9, 2004 (JP) .................. 2004-262194

(51) Int. Cl.
*H01M 8/24* (2006.01)
*H01M 8/22* (2006.01)
*H01M 8/00* (2006.01)
*F23J 11/04* (2006.01)
*B60K 1/00* (2006.01)
*B60L 11/18* (2006.01)

(52) U.S. Cl. .......... 429/452; 429/505; 454/2; 180/65.31

(58) Field of Classification Search .................. 429/444, 429/452, 505; 454/254, 2; 165/41; 180/65.3, 180/65.31; 261/29; 280/782
See application file for complete search history.

(56) References Cited

U.S. PATENT DOCUMENTS

| | | | | |
|---|---|---|---|---|
| 3,606,982 | A | * | 9/1971 | Anderson ................ 261/29 |
| 5,918,663 | A | * | 7/1999 | Hoglinger et al. ........ 165/41 |
| 2002/0036026 | A1 | | 3/2002 | Ono et al. |
| 2003/0038470 | A1 | * | 2/2003 | Chernoff et al. ......... 280/782 |
| 2005/0139402 | A1 | * | 6/2005 | Yamashita ............. 180/65.3 |

FOREIGN PATENT DOCUMENTS

| | | |
|---|---|---|
| EP | 1115165 A2 * | 7/2001 |
| GB | 2 341 676 A | 3/2000 |
| JP | A 62-286823 | 12/1987 |
| JP | U 5-3010 | 1/1993 |
| JP | A 5-270253 | 10/1993 |
| JP | A 7-25223 | 1/1995 |
| JP | A 11-1122 | 1/1999 |
| JP | A 2001-229948 | 8/2001 |

(Continued)

*Primary Examiner* — Jonathan Crepeau
*Assistant Examiner* — Kenneth Douyette
(74) *Attorney, Agent, or Firm* — Oliff & Berridge, PLC

(57) ABSTRACT

This invention provides a moving object having a fuel cell system, which is capable of preventing the entry of fuel gas into a cabin even if the leakage of the fuel gas occurs. The moving object, having the fuel cell system (1), has an air introduction mechanism (5) for introducing air from the outside of the moving object into a cabin space inside the moving object, wherein an air introduction port (50) for the air introduction mechanism (5) is formed a given distance apart from the fuel cell system (1), so that gas leaking from the fuel cell system (1) does not reach the air introduction port (50).

13 Claims, 4 Drawing Sheets

FOREIGN PATENT DOCUMENTS

| | | |
|---|---|---|
| JP | A-2002-96648 | 4/2002 |
| JP | A 2002-134154 | 5/2002 |
| JP | A 2002-240535 | 8/2002 |
| JP | A 2003-34267 | 2/2003 |
| JP | A-2003-151605 | 5/2003 |
| JP | A 2003-229150 | 8/2003 |
| JP | A-2003-341554 | 12/2003 |
| JP | A 2004-166488 | 6/2004 |
| JP | A-2004-175281 | 6/2004 |
| WO | WO-2004/020237 A * | 3/2004 |

* cited by examiner

MOVING OBJECT WITH FUEL CELL SYSTEM

BACKGROUND

The present invention relates to an improvement of an outside air introducing method in a moving object having a fuel cell system.

Normally, an automobile having an internal combustion engine introduces air from an air introduction port on a windshield base and supplies the air into a cabin when introducing outside air into an air conditioning system (so-called air conditioner). For example, in the case of an air conditioner disclosed in Japanese Patent Laid-Open No. 2002-240535, outside air is introduced from an upper part of an engine room adjacent to a windshield.

In recent years, a fuel cell system attracts lots of attention as a power source of an automobile or the like. When this type of fuel cell system is mounted on an automobile, a large part of the fuel cell system is housed in an engine room (a space in front of a cabin) similarly to an internal combustion engine. Since hydrogen is used in the fuel cell system, it is necessary to prevent the entry of hydrogen into a cabin as much as possible.

If the fuel cell system is housed in the space in front of the cabin similarly to the internal combustion engine in the automobile having the same air introduction structure as the conventional one, however, a gas leak, if any, can easily lead to the entry of hydrogen into the cabin from the air introduction port through the air conditioner.

SUMMARY

Therefore, it is an object of the present invention to provide a structure of a moving object having a fuel cell system capable of preventing the entry of fuel gas into a cabin even if a fuel gas leak occurs.

The present invention that achieves the object is a moving object having a fuel cell system and an air introduction mechanism for introducing air from the outside of the moving object into a cabin space inside the moving object, wherein an air introduction port for the air introduction mechanism is formed a given distance apart from the fuel cell system, so that gas leaking from the fuel cell system does not reach the air introduction port.

According to this constitution, air is introduced from the air introduction port to the air introduction mechanism, while the air introduction port is apart the given distance from the fuel cell system. Therefore, even if gas leaks from the fuel cell system, it is possible to prevent the entry of the gas leaking from the air introduction port into the air introduction mechanism.

In this regard, preferably the "fuel cell system" includes at least one of a fuel cell stack, a hydrogen gas supply system, and a hydrogen gas discharge system.

In the above, the "air introduction mechanism" is a device/machine capable of introducing outside air. Although it is not particularly limited, it includes an air conditioning system if the moving object is an automobile or the like, because the air conditioning system is a typical air introduction mechanism.

Furthermore, the "moving object" is not limited, but includes all kinds of movable things such as, for example, cars, trains, ships, airplanes, and the like.

Still further, the "given distance" is not limited, but it requires that the air introduction port is apart from the fuel cell system to the extent that the leak gas cannot easily enter the air introduction mechanism. The given distance depends upon whether the air introduction port is located downstream of air flow generated along with the traveling of the moving object relative to the fuel cell system or it is located in a branch diverging from the direct downstream.

For example, it is preferable that the air introduction port is formed on a roof of the cabin. With this constitution, the roof of the cabin is enough apart from the fuel cell system and is located in a branch diverging from the downstream of the fuel cell system during traveling. Therefore, the constitution is preferable because it prevents the entry of the leak gas.

In this instance, it is preferable that the moving object has a pillar for supporting the roof and the pillar has an air-introduction passage inside that communicates with the air introduction port. More preferably, the pillar is a front pillar located forward in the traveling direction of the moving object.

According to a preferred aspect, it is also possible to form an outlet for discharging liquid entering from the air introduction port on a side of the roof. In this instance, the outlet is preferably located above a front windshield.

Furthermore, according to a preferred aspect, the moving object can have a bonnet for covering a part of the fuel cell system and the bonnet can cover a part of the air introduction mechanism.

From a different viewpoint, the air introduction port can be formed on a body side or a body bottom of the moving object.

According to another aspect, preferably the present invention for achieving the above object is a moving object that has a fuel cell system, and an air introduction mechanism for introducing air from the outside of the moving object into a cabin space inside the moving object, wherein an air introduction port for the air introduction mechanism is formed forward in the traveling direction viewed from the fuel cell system. With this constitution, the air introduction port is inevitably located upstream of the fuel cell system in the air flow during traveling. Therefore, even if gas leaks from the fuel cell system, it will be not introduced into the air introduction mechanism. In this instance, the distance between the air introduction port and the fuel cell system can be short.

In the above, the "traveling direction" means a direction in which the moving object typically moves. As long as the moving object is designed primarily for the purpose of moving forward even if it is designed so as to be capable of moving backward as well as moving forward, the direction of moving forward is the traveling direction mentioned here.

Furthermore, it is preferable that an aperture of the air introduction port is formed inclined forward in the traveling direction. Where the aperture of the air introduction port is inclined forward in this manner, air flow naturally enters the air introduction mechanism during traveling efficiently.

Furthermore, according to a preferred aspect, the air introduction port can be formed on a front part or a front bumper of the moving object. More preferably, the front part has discharging means for discharging liquid entering from the air introduction port and still more preferably an outlet of the discharge means open downward.

According to a preferred aspect, the air introduction passage in communication with the air introduction port can extend upward from upstream toward downstream.

Furthermore, according to a preferred aspect, another moving object of the present invention has a bonnet for covering a part of the fuel cell system and the bonnet can cover almost all parts of the air introduction mechanism.

According to still another aspect, the air introduction port of the air introduction mechanism can be formed backward in the traveling direction viewed from the fuel cell system. In this regard, the air introduction port can be formed inclined backward in the traveling direction. Naturally, this kind of structure is not a problem only if it prevents gas leaking from the fuel cell system, if any, from reaching the air introduction passage. In this aspect, air is easily introduced to the moving object, for example, when the moving object moves backward.

Furthermore, the aperture of the air introduction port can be formed inclined backward in the traveling direction. According to this constitution, air is easily introduced when the moving object moves backward.

Moreover, it is preferable that the discharging means for discharging liquid entering from the air introduction port is provided. It is because, if the discharge means is provided in this manner, it can discharge rainwater or other liquid, if any, and therefore it prevents the entry of the liquid into the air introduction mechanism.

Furthermore, the air introduction port can be formed at a plurality of places.

According to the above present invention, the air introduction port is formed in a location where gas leaking from the fuel cell system is not easily introduced into the air introduction port. Therefore, even if there is a gas leak, it is possible to prevent the entry of the fuel gas into the cabin.

DETAILED DESCRIPTION

Embodiments of the present invention will be described below by using the drawings. The embodiments described below are illustrations in which the moving object of the present invention is applied to a fuel cell automobile (hereinafter, referred to as the present automobile) and they can be modified in various ways without being limited to the following embodiments.

First Embodiment

Figure 1:
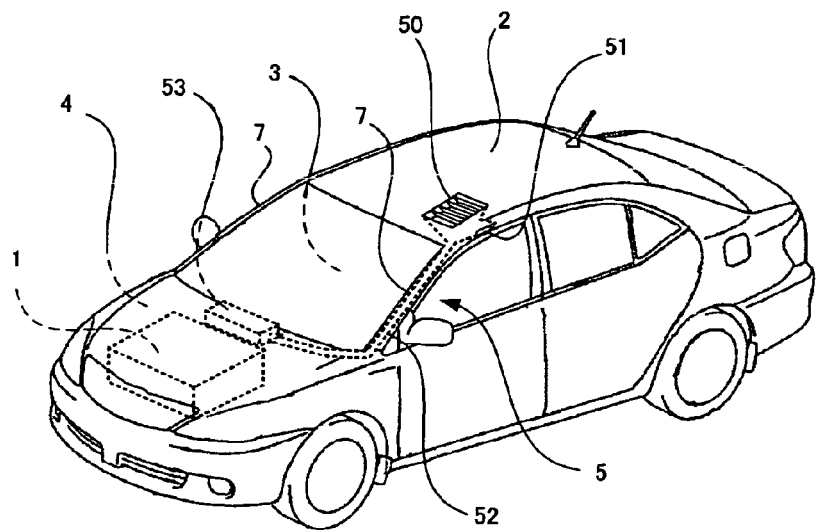
FIG. 1 is a perspective diagram of a fuel cell automobile having an air introduction structure according to a first embodiment.
Figure 2A:
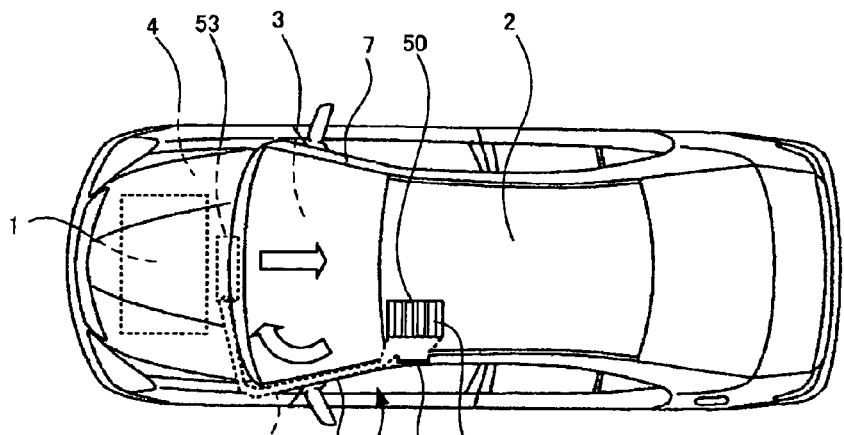
FIGS. 2A and 2B are a plan view and a side view of the fuel cell automobile having the air introduction structure according to the first embodiment.
Figure 2B:
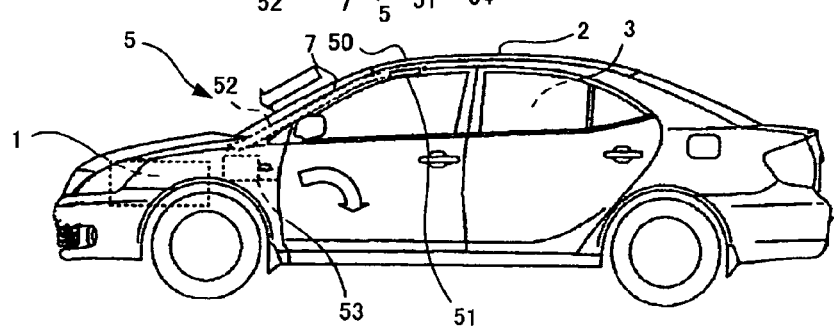

FIG. 1 shows a perspective diagram of the present automobile according to a first embodiment. FIGS. 2A and 2B show a plan view and a side view of the present automobile, respectively. As shown in these figures, the present automobile is a moving object having a fuel cell system 1. The present automobile is characterized in that an air introduction port 50 for an air conditioning system 53 included in an air introduction mechanism 5 is formed a given distance apart from the fuel cell system 1, more specifically such that the air introduction port 50 is formed on a roof 2 of a cabin 3, so that gas leaking from the fuel cell system 1 does not reach the air introduction port 50.

The present automobile includes the cabin 3 provided with the roof 2, a space 4 in front of the cabin (a compartment, a housing section, and the inside of a bonnet) for housing a large part of the fuel cell system 1, and the air introduction mechanism 5 according to the present invention. The space in front of the cabin corresponds to an engine room in the case of an engine vehicle. The air introduction mechanism 5 includes the air introduction port 50, a liquid outlet 51, an air introduction passage 52, the air conditioning system 53, and a guide 54. The air conditioning system 53 is housed in the space 4 in front of the cabin. The roof 2 of the cabin 3 is supported by a pillar 7 and the inside of the pillar 7 (so-called A pillar or front pillar) formed forward in the traveling direction is communicated with the air introduction passage 52.

The air introduction port 50 for the air introduction mechanism 5 is formed apart from the fuel cell system 1 as described above. Therefore, even if gas leaks from the fuel cell system 1, the leak gas is prevented from being introduced into the air introduction mechanism 5 from the air introduction port 50.

Particularly in this embodiment, the air introduction port 50 is formed on the roof 2 of the cabin 3. Therefore, the air introduction port 50 is not only apart from the fuel cell system 1, but also located in a position diverging from the downstream of the fuel cell system 1 during traveling of the present automobile. Therefore, the leak gas can be reliably prevented from being introduced.

Figure 3:
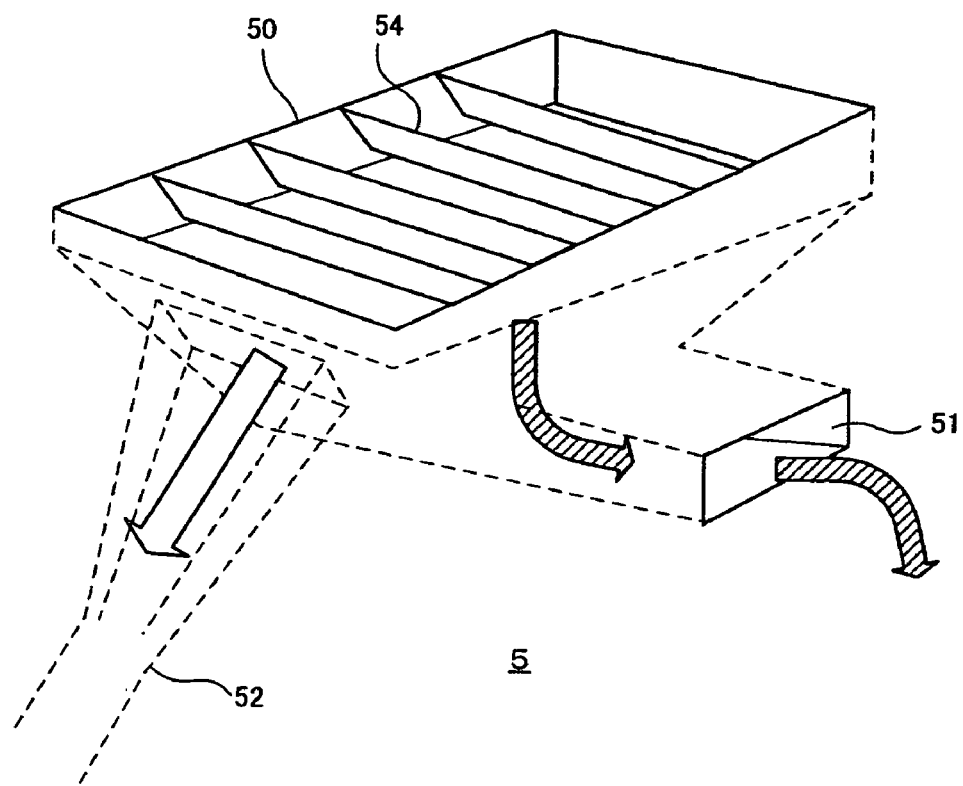
FIG. 3 is an enlarged perspective diagram of an air introduction port and components therearound.

FIG. 3 shows an enlarged perspective diagram of the air introduction port 50 and components therearound. As shown in FIG. 3, an aperture of the air introduction port 50 is formed inclined forward in the traveling direction of the present automobile. Since the aperture of the air introduction port 50 is thus inclined forward, air flow can efficiently enter the air introduction mechanism 5 naturally during traveling of the present automobile in this structure. Moreover, due to the provision of the guide 54, the flow direction of the air flow can be efficiently changed to the direction toward the air introduction passage 52 when the air flow is introduced as indicated by a white arrow in FIG. 3.

Furthermore, the air introduction mechanism 5 of the first embodiment has discharging means for discharging rainwater or other liquid entering from the air introduction port 50. The discharging means includes the liquid outlet 51. Therefore, even if rainwater or other liquid enters during rainfall or the like, it can be reliably discharged from the liquid outlet 51 by draining the rainwater or the like in the direction indicated by hatched arrows in FIG. 3, so that the liquid is prevented from flowing into the air introduction passage 52. Incidentally, the liquid outlet 51 is located above a windshield.

Figure 4:
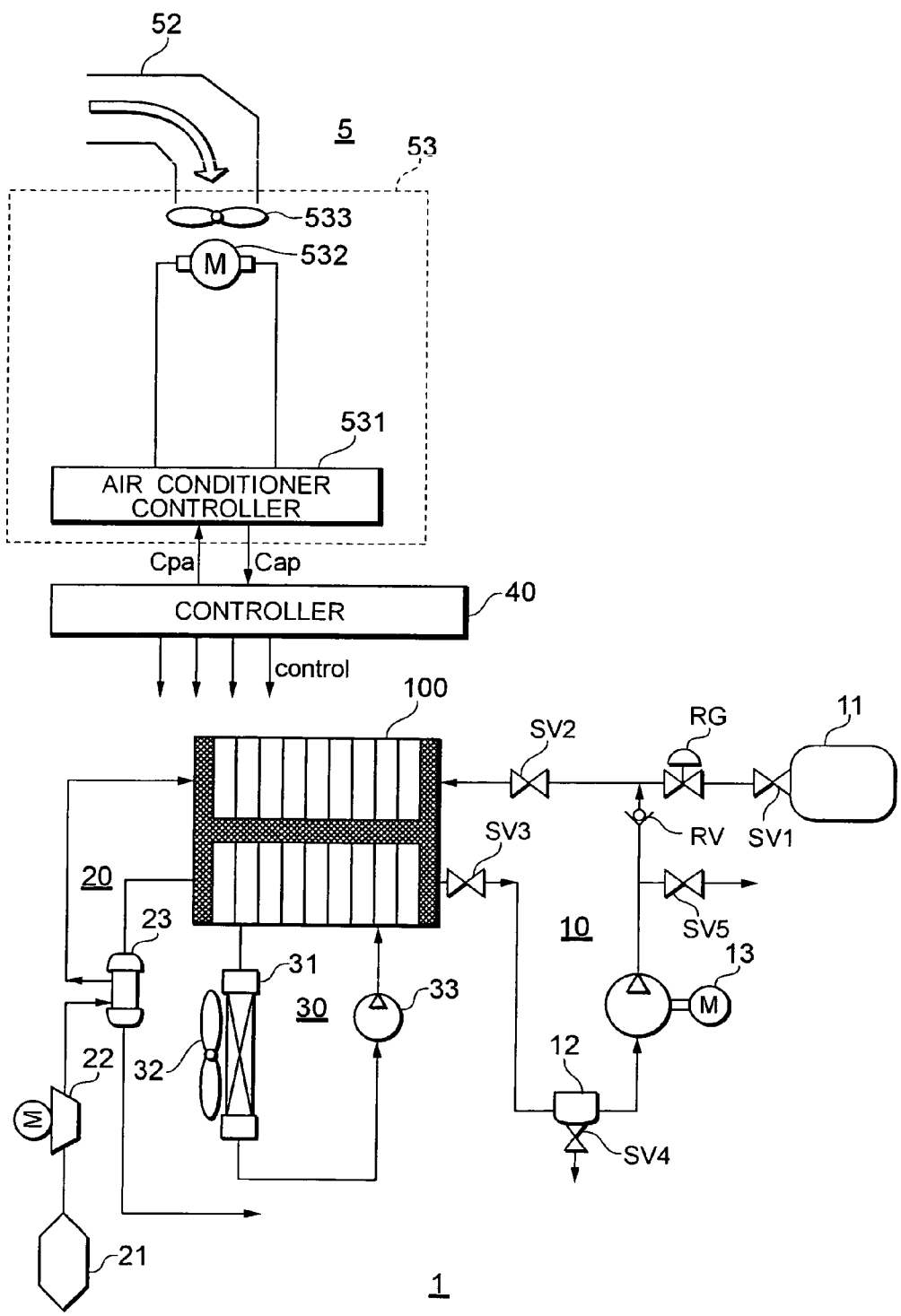
FIG. 4 is a block diagram of a fuel cell system according to the embodiment.

FIG. 4 shows a block diagram of the fuel cell system 1. As shown in FIG. 4, the fuel cell system 1 includes a fuel cell stack 100 operating as a fuel cell of the present invention. The fuel cell system 1 includes a hydrogen gas supply system 10 for supplying hydrogen gas as fuel gas to the fuel cell stack 100, an air supply system 20 for supplying air as oxide gas to the fuel cell stack 100, a cooling system 30 for cooling the fuel cell stack 100, and a controller 40 for these systems, so that the fuel cell system 1 can control the air conditioning system 53 of the air introduction mechanism 5 according to the present invention.

The fuel cell stack 100 has a stack structure in which a plurality of electric power generation structures referred to as single cells are stacked. Each single cell has a structure in which a power generation element referred to as a membrane electrode assembly (MEA) is sandwiched between a pair of separators provided with flow paths for hydrogen gas, air, and cooling water. The MEA includes a polyelectrolyte membrane sandwiched between two electrodes, namely an anode and a cathode. The anode has an anode catalyst layer formed on a porous support layer and the cathode has a cathode catalyst layer formed on a porous support layer.

The hydrogen gas supply system 10 includes sequentially from the source of supplying hydrogen gas, a hydrogen tank 11, a source valve V1, a pressure regulating valve RG, a shut-off valve SV2 at the inlet of the fuel cell, and a shut-off valve SV3 at the outlet of the fuel cell. The hydrogen gas supply system 10 includes, by way of the fuel cell stack 100, a gas-liquid separator 12, a shut-off valve 4, a hydrogen pump 13, a purge shut-off valve SV5, and a check valve RV.

The hydrogen tank 11 is means for supplying hydrogen as fuel gas and the following are applicable to the hydrogen tank 11: a high-pressure hydrogen tank, a hydrogen tank using hydrogen storage alloy, a hydrogen supply mechanism using reformed gas, a tank for supplying hydrogen from a liquid hydrogen tank, a tank for storing liquefied gas fuel, or the like.

The source valve (shut-off valve) SV1 controls whether to supply hydrogen gas from the hydrogen tank 11. The shut-off valve SV2 at the inlet of the fuel cell closes a pipe up to the pressure regulating valve RG located upstream of the shut-off valve SV2. The hydrogen gas fed to the fuel cell stack 100 is supplied to each single cell via a manifold and flows through a fuel gas flow path of a separator, by which an electrochemical reaction occurs in the MEA anode. The shut-off valve SV3 at the outlet of the fuel cell closes a pipe from the shut-off valve SV3 to the shut-off valve SV2 at the inlet of the fuel cell. The gas-liquid separator 12 removes moisture and other impurities generated by the electrochemical reaction of the fuel cell stack 100 during normal operation from the hydrogen off-gas and discharges them to the outside through the shut-off valve SV4. The hydrogen pump 13 forcibly circulates hydrogen gas in a circulating path for hydrogen gas passing through the shut-off valves SV2 and SV3 and the check valve RV. While the purge shut-off valve SV5 is opened during purge, it is closed during the normal operating state and during determination of gas leak in the pipe. The downstream of the purge shut-off valve SV5 constitutes a hydrogen gas discharge system. The check valve RV prevents reverse flow of the hydrogen gas. Hydrogen off-gas purged from the purge shut-off valve SV5 is processed by an exhaust system including a diluter, which is not shown.

The air supply system 20 includes an air cleaner 21, a compressor 22, a humidifier 23 and so on. The air cleaner 21 cleans air and introduces it into the fuel cell system. The compressor 22 compresses the introduced air to change the volume or pressure of the air to be supplied under the control of the controller 40. The humidifier 23 adds adequate moisture to the compressed air by replacing air off-gas with moisture. The air fed to the fuel cell stack 100 is supplied to each single cell via a manifold and flows through an air flow path of a separator, by which an electrochemical reaction occurs at a cathode in a MEA. Regarding air off-gas discharged from the fuel cell stack 100, the diluter, which is not shown, dilutes hydrogen off-gas purged from the purge shut-off valve SV5 and discharges it to the exhaust system.

The cooling system 30 includes a radiator 31, a fan 32, and a cooling pump 33, so that coolant is circularly supplied to the inside of the fuel cell stack 100. More specifically, the coolant is supplied to each single cell via a manifold after entering the fuel cell stack 100 and flows through a coolant flow path of a separator so as to draw heat generated by power generation.

The controller 40 has a configuration of a general-purpose computer including a RAM, a ROM, and an interface circuit. The entire fuel cell system 1, mainly including the hydrogen gas supply system 10, the air supply system 20, and the cooling system 30, is controlled by sequentially executing software programs stored in an internal ROM or the like.

The air conditioning system 53, which is a part of the air introduction mechanism 5, includes an air conditioner controller 531, a blower motor 532, and a blower fan 533.

The air conditioner controller 531 has a configuration of a general-purpose computer including a RAM, a ROM, and an interface circuit. The blower motor 532 is configured integrally with the blower fan 533 and located downstream of the air introduction passage 52. It sucks the outside or inside air and supplies it to the cabin based on the control of the air conditioner controller 531. In the downstream of the blower fan 533, there are further provided an evaporator, an air mix door, a heater core, a mode switching door, and the like, which are not shown, so that the air conditioner controller 531 can control the selection between heating and cooling, the driving of a defroster, the selection of an air outlet (from below, rear, or front) and the like. For example, the air conditioner controller 531 determines the adaptations to temperature deviation, outside air temperature, and solar radiation according to the definition of a given function and controls a blowing temperature, a blower volume, and the air outlet with computation of the algebraic-product-addition-barycenter method or the like.

The air conditioning system includes a circulating path connecting a compressor, a capacitor, an expansion valve, and the like, which are not shown, in addition to the evaporator described above. The evaporator cools down air discharged from the blower fan 533 by low temperature and low pressure misty refrigerant. The compressor compresses a low temperature and low pressure refrigerant gasified by the evaporator that absorbs heat. The capacitor radiates heat of the refrigerant changed to high temperature and high pressure gas by the compressor. The expansion valve performs adiabatic expansion of the high temperature and high pressure refrigerant changed to liquid by the capacitor and supplies it as a low temperature and low pressure misty refrigerant to the evaporator described above.

More specifically, the air conditioner controller 531 controls the air conditioning system 53 so that the cabin is maintained at a preset temperature and a preset humidity by referring to detection signals from a temperature sensor and a humidity sensor, which are not shown. Moreover, the air conditioner controller 531 refers to a control signal Cpa from the controller 40 and, if the control signal Cpa from the controller 40 indicates that the air conditioner blower is on, it drives the blower motor 532 to rotate the blower fan 533 so as to generate an air flow. If the control signal Cpa indicates that the air conditioner blower is off, the air conditioner controller 531 stops the blower motor 532 to stop the generation of an air flow caused by the blower fan 533. Moreover, the air conditioner controller 531 controls the air conditioning system 53 to introduce air if the control signal Cpa indicates that air should be introduced and controls the air conditioning system 53 to circulate inside air if the control signal Cpa indicates that inside air should be introduced.

Since the fuel cell system 1 has a lot of valves and pipe structures connected to each other as described above, hydrogen gas leaks in some cases. While this kind of hydrogen gas leak can be detected by a gas leak inspection function, it is necessary to prevent the leakage of the hydrogen gas from entering the cabin 3 as much as possible.

In this regard, according to the structure of the first embodiment, the air introduction port 50 for the air introduction mechanism 5 for introducing air into the cabin 3 is apart from the fuel cell system 1 such as on the roof 2 of the cabin 3 and further located in a place diverging from the downstream of the fuel cell system 1 during traveling of the present automobile. Therefore, it is possible to prevent the leakage the hydrogen gas from being introduced into the cabin 3.

Particularly according to the first embodiment, the aperture of the air introduction port 50 is inclined in the traveling direction of the present automobile and therefore the outside air can be efficiently introduced therein.

Furthermore, according to the first embodiment, the automobile includes means for discharging liquid entering the air introduction port 50. Therefore, even if rainwater or other liquid enters the air introduction port 50, the liquid can be reliably discharged from the liquid outlet 51.

Second Embodiment

A second embodiment of the present invention is characterized in that an air introduction port of an air introduction mechanism is formed forward in the traveling direction, viewed from a fuel cell system.

Figure 5:
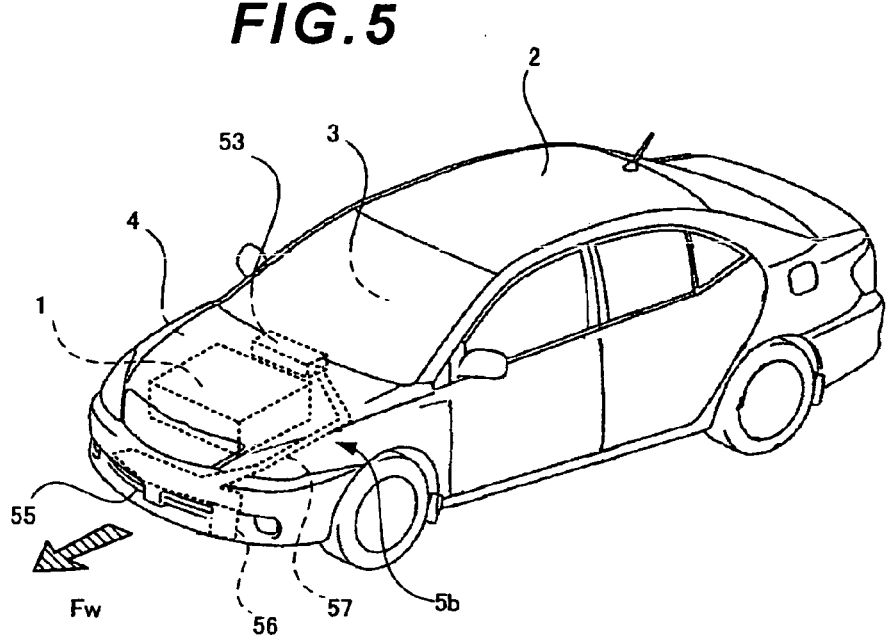
FIG. 5 is a perspective diagram of a fuel cell automobile having an air introduction structure according to a second embodiment.
Figure 6A:
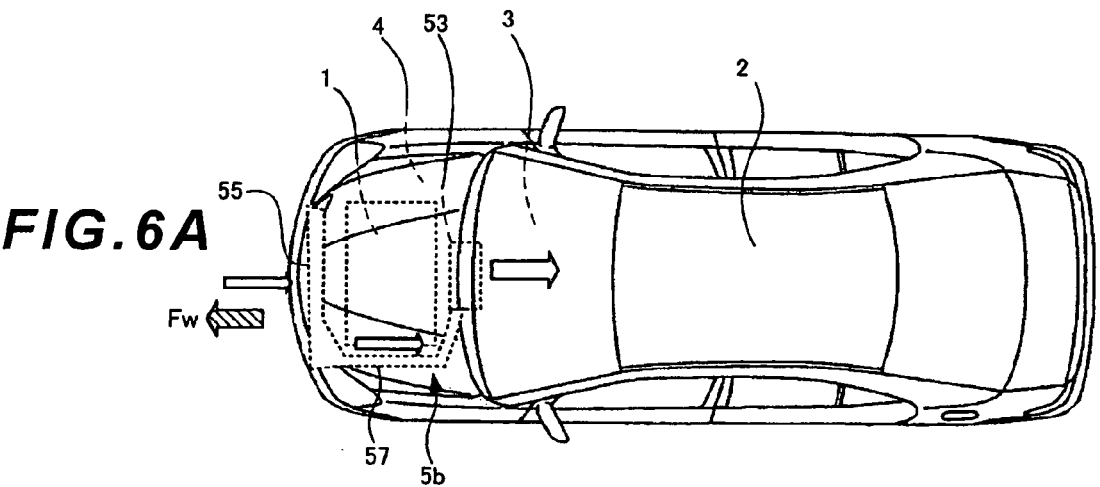
FIGS. 6A and 6B are a plan view and a side view of the fuel cell automobile having the air introduction structure according to the second embodiment.
Figure 6B:
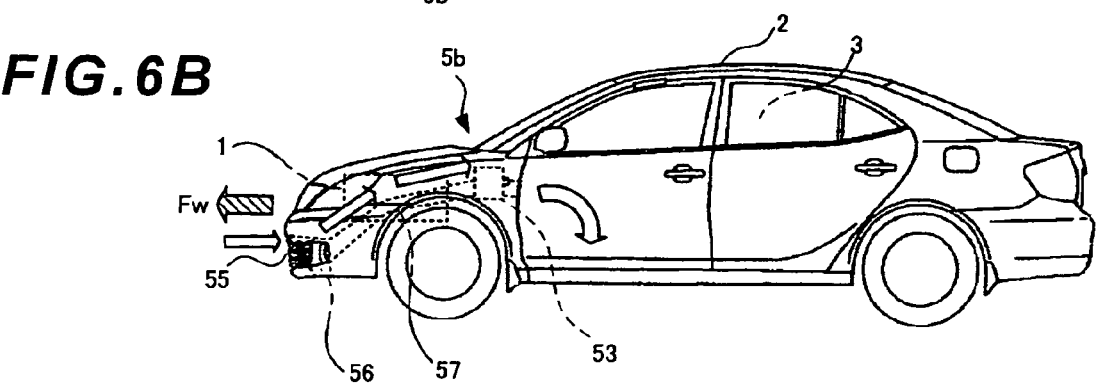

FIG. 5 shows a perspective diagram of the present automobile according to the second embodiment. Furthermore, FIG. 6A shows a plan view of the present automobile and FIG. 6B shows a side view thereof.

The present automobile includes a cabin 3 provided with a roof 2, a space 4 in front of the cabin, which houses a large part of a fuel cell system 1, and an air introduction mechanism 5b according to this embodiment. The air introduction mechanism 5b includes an air introduction port 55, a liquid outlet 56, an air introduction passage 57, and an air conditioning system 53 similar to that in the first embodiment. The air conditioning system 53 has the same configuration as in the first embodiment and it is housed in the space 4 in front of the cabin and is located behind the fuel cell system 1.

Particularly in this embodiment, the air introduction port 55 for the air introduction mechanism 5b is formed forward in the traveling direction Fw (the direction indicated by a white arrow) of the present automobile, viewed from the fuel cell system 1. The air introduction port 55 is located forward of the fuel cell system 1 in this manner and therefore the air introduction port 55 is necessarily located upstream of the fuel cell system 1 during traveling of the present automobile. Accordingly, even if a gas leak occurs in the fuel cell system 1, the leak gas will not be introduced into the air introduction mechanism 5b in this structure. Incidentally, the air introduction port 55 is formed on a front bumper of the present automobile.

Moreover, the air introduction mechanism 5b is provided with the liquid outlet 56 for discharging rainwater or other liquid entering from the air introduction port 55, by which it is possible to prevent the rainwater or the like from entering the air conditioning system 53 from the air introduction passage 57. The liquid outlet 56 is formed on a front part of the present automobile where the front bumper thereof is located.

With this structure, air is introduced from the air introduction port 55 in the direction indicated by the white arrow as the automobile moves forward (in the direction indicated by the hatched arrow). And air is guided from the air introduction passage 57 to the air conditioning system 53 after the rainwater or other liquid drops by its own weight to be discharged from the liquid outlet 56.

Therefore, according to the second embodiment, even if hydrogen gas leaks from the fuel cell system 1 during traveling of the present automobile, it is possible to prevent hydrogen gas from entering the inside of the cabin 3 through the air introduction mechanism 5b since the air introduction port 55 is located forward in the traveling direction of the fuel cell system 1.

Particularly according to the second embodiment, the air introduction port 55 is formed upstream of air flow during traveling, which leads to an arrangement where hydrogen gas can not easily enter the air introduction mechanism 5b even if the air introduction port is spaced a short distance from the fuel cell system.

[Variations]

The present invention is not limited to the above embodiments but can be varied in various ways. For example, while the air introduction passage 52 is communicated only with one of the pillars 7 in the first embodiment, the roof 2 may have a plurality of air introduction ports 50 that communicate with the air introduction passages 52 in common, which is provided in the plurality of pillars. The larger the opening area of the air introduction port 50 is or the larger the cross-sectional area of the air introduction passage 52 is, the more air is introduced.

Furthermore, the air introduction port 50 can be formed on the side (body side) of the automobile or the bottom (body bottom) of the automobile, instead of on the roof 2, in the first embodiment.

Still further, depending on the structure of the automobile (moving object), the air introduction port 50 for the air introduction mechanism maye be located backward in the traveling direction, viewed from the fuel cell system 1. For example, if the air introduction port is inclined backward in the traveling direction or there is a fin around the air introduction port and it prevents leak fuel gas, if any, from reaching the air introduction passage, the air introduction port can be located backward.

Moreover, the aperture of the air introduction port 50 can be formed inclined backward in the traveling direction. If it is inclined backward in this manner, gas leaking from the fuel cell system 1 can not easily enter the air introduction port even if the air introduction port is located backward in the. traveling direction viewed from the fuel cell system 1, while air can be easily introduced when the automobile moves backward.

Furthermore, the arrangement can be such that a plurality of air introduction ports can be provided, some of them can be inclined forward, and others can be inclined backward so that air is introduced if the moving object moves in any direction.

The invention claimed is:

1. A moving object comprising:
   a fuel cell system;
   a cabin;
   a pillar for supporting a roof of the cabin; and
   an air introduction mechanism for introducing air from outside of the moving object into a cabin space inside the cabin, wherein:
   an air introduction port for the air introduction mechanism is formed a given distance apart from the fuel cell system on the roof of the cabin so that gas leaking from the fuel cell system does not reach the air introduction port,
   the pillar has an air introduction passage inside the pillar that communicates with the air introduction port,
   the air introduction port is formed backward in a traveling direction relative to the fuel cell system, and
   the air introduction port has an aperture that is formed inclined backward in the traveling direction against a surface of the roof of the cabin.

2. A moving object according to claim 1, wherein the pillar is a front pillar located forward in the traveling direction of the moving object.

3. A moving object according to claim 1, wherein an outlet is formed for discharging liquid entering from the air introduction port on a side of the roof.

4. A moving object according to claim 3, wherein the outlet is located above a front windshield.

5. A moving object according to claim 1, further comprising a bonnet for covering a part of the fuel cell system, wherein the bonnet covers a part of the air introduction mechanism.

6. A moving object according to claim 1, wherein the air introduction port is formed at a plurality of places.

7. A moving object according to claim 1, further comprising discharging means for discharging liquid entering from the air introduction port.

8. A moving object according to claim 1, wherein the fuel cell system includes at least one of a fuel cell stack, a hydrogen gas supply system, and a hydrogen gas discharge system.

9. A moving object according to claim 1, wherein the air introduction mechanism includes an air conditioning system.

10. A moving object comprising:

a fuel cell system;

a cabin; and an air introduction mechanism for introducing air from outside of the moving object into a cabin space inside the cabin, wherein:

an air introduction port for the air introduction mechanism is formed on a front part of the moving object forward in a traveling direction relative to the fuel cell system, an air introduction passage in communication with the air introduction port extends upward from upstream to downstream and is located on a side of the fuel cell system, and the air introduction mechanism has an air conditioning system connected with the air introduction port by the air introduction passage, the air conditioning system being formed backward in the traveling direction relative to the fuel cell system.

11. A moving object according to claim 10, wherein the front part has discharging means for discharging liquid entering from the air introduction port.

12. A moving object according to claim 11, wherein an outlet of the discharging means opens downward.

13. A moving object according to claim 10, further comprising a bonnet for covering a part of the fuel cell system, wherein the bonnet covers almost all parts of the air introduction mechanism.

* * * * *